US007408936B2

(12) United States Patent
Ge et al.

(10) Patent No.: US 7,408,936 B2
(45) Date of Patent: Aug. 5, 2008

(54) SCALABLE VLAN GROUPING IN A PROVIDER METRO ETHERNET

(75) Inventors: An Ge, Plano, TX (US); Maher Ali, Richardson, TX (US); Girish Chiruvolu, Plano, TX (US)

(73) Assignee: Alcatel Lucent, Paris (FR)

( * ) Notice: Subject to any disclaimer, the term of this patent is extended or adjusted under 35 U.S.C. 154(b) by 714 days.

(21) Appl. No.: 10/922,602

(22) Filed: Aug. 20, 2004

(65) Prior Publication Data
US 2006/0039383 A1 Feb. 23, 2006

(51) Int. Cl.
*H04L 12/28* (2006.01)
*H04L 12/66* (2006.01)

(52) U.S. Cl. .............. 370/392; 370/395.21; 370/396; 370/398; 370/401; 370/411; 709/218; 709/222; 709/226; 709/228; 709/231

(58) Field of Classification Search ............. 370/389, 370/392, 396, 400, 401
See application file for complete search history.

(56) References Cited

U.S. PATENT DOCUMENTS

| 6,449,279 | B1 | 9/2002 | Belser et al. | |
|---|---|---|---|---|
| 6,618,388 | B2* | 9/2003 | Yip et al. | 370/401 |
| 6,674,760 | B1* | 1/2004 | Walrand et al. | 370/411 |
| 6,678,248 | B1* | 1/2004 | Haddock et al. | 370/235 |
| 6,681,232 | B1* | 1/2004 | Sistanizadeh et al. | 707/104.1 |
| 6,912,592 | B2* | 6/2005 | Yip | 709/249 |
| 7,092,389 | B2* | 8/2006 | Chase et al. | 370/389 |
| 7,120,150 | B2* | 10/2006 | Chase et al. | 370/395.1 |
| 7,260,097 | B2* | 8/2007 | Casey | 370/392 |
| 7,295,568 | B2* | 11/2007 | Kossi et al. | 370/432 |
| 7,345,991 | B1* | 3/2008 | Shabtay et al. | 370/221 |
| 2002/0091795 | A1 | 7/2002 | Yip | |
| 2002/0101870 | A1* | 8/2002 | Chase et al. | 370/389 |
| 2003/0133459 | A1* | 7/2003 | Siddiqui et al. | 370/395.21 |
| 2003/0174706 | A1* | 9/2003 | Shankar et al. | 370/393 |
| 2004/0017816 | A1 | 1/2004 | Ishwar et al. | |
| 2004/0032868 | A1 | 2/2004 | Oda et al. | |
| 2004/0078469 | A1 | 4/2004 | Ishwar et al. | |
| 2004/0165600 | A1* | 8/2004 | Lee | 370/395.53 |
| 2004/0174887 | A1* | 9/2004 | Lee | 370/395.53 |
| 2005/0132088 | A1* | 6/2005 | Sridhar et al. | 709/249 |
| 2005/0160180 | A1* | 7/2005 | Rabje et al. | 709/238 |

OTHER PUBLICATIONS

Santitoro, Ralph; Metro Ethernet Services Overview; Metro Ethernet Forum Presentations; Enterprise Networks 2004 Metro Ethernet Summit; London, Jul. 5, 2004; pp. cover page and 15-17.
Seaman, Mick; Large Scale Q-in-Q—(1) Scalabe Address Learning; downloaded from the internet Nov. 5, 2004 (www.ieee802.org/1/files/public/ docs2003/ScalableQinQLearning.pdf); Jul. 2003 802.1 meeting presentation; pp. 1-10.

* cited by examiner

*Primary Examiner*—Hassan Kizou
*Assistant Examiner*—Brian T O'Connor

(57) ABSTRACT

A method of routing packets in network system where the network system comprises a plurality of edge nodes and a plurality of core nodes. Selected core nodes are coupled to communicate with selected edge nodes. The network system also comprises a plurality of external nodes, with selected external nodes coupled to communicate with selected edge nodes, and where different external nodes are associated with a plurality of different entities sharing resources on the network system. The method comprises proposing a set of entities from the plurality of different entities. The proposed set comprises entities associated with external nodes that share respective connections to a number of edge nodes in the edge nodes such that the shared number is less than a total number of all edge nodes to which each different entity in the set is connected, with other aspects then taken with respect to the proposed set.

21 Claims, 3 Drawing Sheets

SCALABLE VLAN GROUPING IN A PROVIDER METRO ETHERNET

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to computer networks and are more particularly directed to a scalable virtual local area network ("VLAN") grouping in a provider Metro Ethernet.

Ethernet networks have found favor in many applications in the networking industry for various reasons. For example, Ethernet is a widely used and cost effective medium, with numerous interfaces and speed capability up to the Gbps range. Ethernet networks may be used to form a network sometimes referred to as a Metro Ethernet Network ("MEN"), which is generally a publicly accessible network that is often affiliated with a metropolitan area—hence, the term "Metro" Ethernet. A MEN provides a so-called Metro domain, typically under the control of a single administrator or manager, such as an Internet Service Provider ("ISP"). A MEN is typically used to connect between an access network and a core network. The access network often includes edge nodes that couple to private or end users, that is, customer nodes, making connectivity to the network. The core network is used to connect to other Metro Ethernet Networks and it provides primarily a packet switching function.

With the development of the MEN architecture, there have further evolved additional topologies associated with such a network. One type of such an overlay is referred to as virtual local area network ("VLAN"). Previously a LAN was considered a network spanning a short distance, such as within a single building or campus and for a single company. However, with the MEN architecture, an entity such as a business can obtain interconnection at greater distances and through the MEN, thereby giving rise to the VLAN in that from the perspective of the entity, users within it still have access in a manner that appears for practical purposes no different than a LAN, but it is considered "virtual" in that it spans a greater distance to remote locations and overlays a bigger network. In addition, under the control of the ISP or other manager, a MEN is often used by multiple entities, or "customers," whereby from one customer's perspective all other customers' VLANs are transparent. However, certain policies and issues are enforced by the manager because the different VLANs do in some instances share resources and, thus, a level of consideration of the interaction between supporting different customers across the same resources must be contemplated.

One aspect in support of multiple and different customers as well as within a customer on a MEN arises in connection with so-called Q-tags, which receive their name in that they are part of the IEEE 802.1Q standard and which are sometimes also known as VLAN tags. A Q-tag is a field that is included in each packet that is communicated in the MEN at the provider level so as to route the packet and thereafter also removed from the packet prior to the packet being routed ultimately to a customer node. For purposes of background to the preferred embodiments described later, two such Q-tags are of interest. A first Q-tag is used by a VLAN customer to subdivide its customer VLAN, sometimes referred to as a C-VLAN, such as by group within the customer. In other words, this first Q-tag identifies different groups within the C-VLAN of the respective customer. For example, if a customer has different business groups, it may assign a different Q-tag to each respective group, and network packets on its C-VLAN with a same Q-tag may then be treated in a manner consistent with the specific group corresponding to that Q-tag. Additionally, because this tag is inserted and used by the customer, it is sometimes referred to as a customer Q-tag. More recently, however, a so-called Q-in-Q scheme has been proposed under the still-developing IEEE 802.1ad standard. This scheme gets its name from the fact that it proposes adding a second Q-tag in each packet and, hence, this second Q-tag is essentially embedded in the same packet with the 802.1 Q-tag. This second Q-tag is inserted in the packets by a provider edge node that is controlled by the MEN manger (e.g., ISP) and to identify a customer. In other words, in general for a MEN with different C-VLANs, then each C-VLAN has a corresponding different Q-tag of this sort. Further, since this second type of Q-tag is inserted by the provider edge node, then it is sometimes referred to as a provider Q-tag.

While the preceding use of Q-tags has proven useful in various operations of a MEN, a drawback has arisen with the increased number of C-VLANs per MEN. Particularly, the provider Q-tag has been understood to use the same general format as the customer Q-tag, particularly given the embedded nature of the Q-in-Q scheme. Thus, since the customer Q-tag is limited to 12 bits, then so has been the provider Q-tag. Moreover, while 12 bits typically provide 4,096 different identifiers (i.e., $2^{12}=4,096$), some of those identifiers are reserved and, hence, in actuality only about 4,000 identifiers are available for the customer Q-tag. Similarly, therefore, only about 4,000 identifiers are available for the provider Q-tag. While this number may appear sufficient in some contexts, in contemporary MENs an increasing number of C-VLANs may require support in a single Metro domain and, hence, once that number exceeds 4,000, then each C-VLAN may no longer be separately identified by a respective provider Q-tag. Therefore, there is a potential scalability problem that needs to be addressed.

One solution has been proposed in an effort to address the above-introduced drawback of increased number of C-VLANs with the corresponding limitation of provider Q-tags in a single MEN. Specifically, an e-mail comment to the proposed IEEE 802.1ad standard suggests allowing different C-VLANs to have the same provider Q-tag, only where those different C-VLANs are all connected to an identical set of edge nodes. For example, for a MEN having edge nodes $EN_0$ through $EN_y$, and for two different customers Customer A and Customer B, both having customer nodes connected to the same set of edge nodes $EN_0$ through $EN_y$, then a single C-VLAN is used to identify Customer A and Customer B. As a result, traffic that is broadcast along this single C-VLAN will be received by the edge nodes that are connected to both Customer A and Customer B and, hence, that traffic may then be filtered if needed by the edge nodes or otherwise forwarded to one or both of those customers. While this approach therefore reduces the number of C-VLAN identifiers needed to indicate all of the C-VLANs on a MEN, it is also constrained in that there may be a limited number of customers that are connected to the very same set of edge nodes. Thus, this approach also has limitations and may not properly scale to a situation having a large number of C-VLANs.

Given the various nodes, attributes, and connectivity described above and known in the art, a need has arisen to address the system limitations, as is achieved by the preferred embodiments as further detailed below.

BRIEF SUMMARY OF THE INVENTION

In the preferred embodiment, there is a method of routing packets in network system. The network system comprises a plurality of edge nodes and a plurality of core nodes. Selected core nodes in the plurality of core nodes are coupled to communicate with selected edge nodes in the plurality of edge nodes. The network system also comprises a plurality of external nodes external from the edge nodes, with selected external nodes coupled to communicate with selected edge nodes in the plurality of edge nodes, and where different external nodes in the plurality of external nodes are associated with a plurality of different entities sharing resources on the network system. The method comprises a step of proposing a set of entities from the plurality of different entities. The proposed set comprises entities associated with external nodes that share respective connections to a number of edge nodes in the plurality of edge nodes such that the shared number is less than a total number of all edge nodes to which each different entity in the set is connected. The method also assigns a single edge node tag to the proposed set of entities. Lastly, the method communicates the single edge node tag to the plurality of edge nodes such that the single edge node tag may be inserted into packets by edge nodes for purposes of routing those packets through certain core nodes in the plurality of core nodes and to external nodes corresponding to the single edge node tag.

Other aspects are also described and claimed.

DETAILED DESCRIPTION OF THE INVENTION

Figure 1:
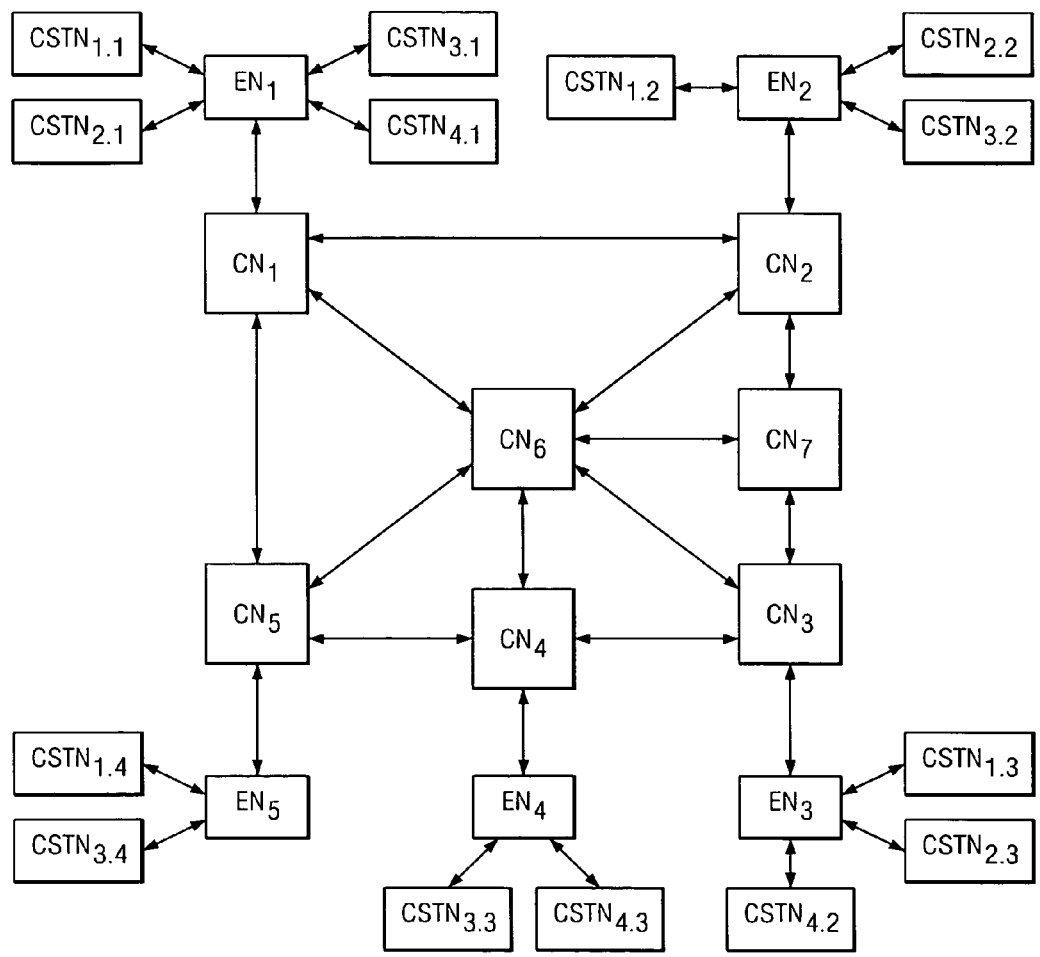
FIG. 1 illustrates a network system according to an example of the preferred embodiments.

FIG. 1 illustrates a block diagram of a system 10 into which the preferred embodiments may be implemented. System 10 generally represents a Metro Ethernet network that includes a number of Metro nodes, which also may be referred to as Ethernet switches. As introduced earlier in the Background Of The Invention section of this document, some of these nodes are typically described as edge nodes or core nodes based on their location in the network; by way of example, system 10 includes seven core nodes $CN_1$ through $CN_7$, where the set of core nodes is often referred to as the core network. Certain ones of the core nodes are connected to corresponding edge nodes, where in the example of FIG. 1 this includes five edge nodes $EN_1$ through $EN_5$, each connected to a respective core node $CN_1$ through $CN_5$. Note that the connections between nodes may be referred to in various manners and may be achieved in various ways, but in any event they permit bi-directional communication between each group of two connected nodes. Moreover, within the core network and as also known in the art, an additional layer of routing may be imposed, such as with one or more spanning trees which thereby define the path along with packets are communicated within the core network for communication along a given spanning tree. In any event, with the core and edge nodes of FIG. 1, these nodes include various aspects as known in the art, such as operating to send packets as a source or receive packets as a destination.

As also known in the art, system 10 is typically coupled with stations or nodes external with respect to the edge nodes, such as may be implemented in the global Internet or at remotely located networks, such as at different physical locations of a business entity—in this document, such nodes are by way of example customer nodes, where such a term is consistent with the earlier discussion in the Background Of The Invention section of this document and where the customers are thereby serviced by a common network manager such as a Service Provider ("SP"). Thus, in the example of FIG. 1, a number of different customer nodes are shown and where each corresponds to one of four customers $CST_1$ through $CST_4$. Further, for sake of reference, each customer node has a designation of $CSTN_{a,b}$; in this convention, the subscript "a" is intended to identify the particular customer corresponding to the given node and the subscript "b" is to distinguish different nodes of that customer. For example, with respect to edge node $EN_1$, there are four customer nodes coupled to communicate with it, each representing a different customer, namely, a customer node $CSTN_{1,1}$ for a customer $CST_1$, a customer node $CSTN_{2,1}$ for a customer $CST_2$, a customer node $CSTN_{3,1}$ for a customer $CST_3$, and customer node $CSTN_{4,1}$ for a customer $CST_4$. However, for sake of demonstration of a typical example and also for reasons appreciated later, in the case of FIG. 1 not all customers are connected to each edge node. For example, with respect to edge node $EN_2$, only customers $C_1$, $C_2$, and $C_3$ have respective nodes coupled to communicate with that edge node (as shown by customer nodes $CSTN_{1,2}$, $CSTN_{2,2}$, and $CSTN_{3,2}$). These examples further introduce the connections that will be apparent to one skilled in the art for each edge node in FIG. 1, and which are summarized in the following Table 1 which identifies each edge node as well as the other node(s) to which it is connected.

TABLE 1

| Node | connected nodes |
| --- | --- |
| $EN_1$ | $CSTN_{1,1}$, $CSTN_{2,1}$, $CSTN_{3,1}$, $CSTN_{4,1}$, $CN_1$ |
| $EN_2$ | $CSTN_{1,2}$, $CSTN_{2,2}$, $CSTN_{3,2}$, $CN_2$ |
| $EN_3$ | $CSTN_{1,3}$, $CSTN_{2,3}$, $CSTN_{4,2}$, $CN_3$ |
| $EN_4$ | $CSTN_{3,3}$, $CSTN_{4,3}$, $CN_4$ |
| $EN_5$ | $CSTN_{1,4}$, $CSTN_{3,4}$, $CN_5$ |

Given the preceding introduction, any customer node can communicate one or more packets in system 10 via its connections to an edge node and through one or more core nodes, ultimately with the packet then leaving the core network (i.e., the group of core nodes) and then exiting via another edge node to another customer node. In this manner, typically the edge node first receiving such a packet and communicating it to the core network is said to be an ingress node in that instance, while another edge node that then receives the packet from the core network and communicates it to a customer node is said to be an egress node in that instance. Still further, of course system 10 is managed in a manner so that each customer has the appearance of operating on its own independent network, which may therefore represent to the customer its own local area network ("LAN"). However, since that network in fact shares resources used by other customers, in actuality each customer's network is more appropriately referred to as a virtual LAN or VLAN, and insofar as it is the customer's VLAN, then it also is referred to as a customer-VLAN or C-VLAN. In any case, for the C-VLANs of FIG. 1 as well as system 10 as a whole, one skilled in the art should appreciate that the number of nodes shown in FIG. 1 is solely by way of example and to simplify the illustration and example, where in reality system 10 may include any number of such nodes. Lastly, while the preceding discussion represents system 10 as known in the art, the remaining discussion includes various aspects that improve traffic performance across system 10 according to the scope of the preferred inventive embodiments.

By way of introduction to various aspects of the present inventive scope, the preferred embodiments are directed to establishing Q-tags for the C-VLANs in system 10, where such a Q-tag was introduced in the Background of the Invention section of this document and also referred to as a provider Q-tag. Also introduced therein were two prior art manners for providing such provider Q-tags. In one case, each different customer is given its own provider Q-tag and, thus, in the case of system 10, four such provider Q-tags are required because there are four different customers $CST_1$ through $CST_4$. In another proposed case, if two (or more customers) have customer nodes connected to each of the same edge nodes in a system, then a single provider tag may be assigned to those two customers. However, in the example of FIG. 1, note that no two customers are connected to all of the same edge nodes, as also shown in Table 1. For example, while edge nodes $EN_1$, $EN_2$, and $EN_3$ are all connected to nodes of customers $CST_1$ and $CST_2$, this is not the case for edge nodes $EN_4$ and $EN_5$. Thus, in the latter and proposed approach, again four provider Q-tags are required because there are four different customers $CST_1$ through $CST_4$, each with different connectivity to corresponding edge nodes. In contrast, the preferred embodiments provide a method which in certain instances reduces the number of provider Q-tags in a network (e.g., MEN) and those Q-tags are provided to a network such as system 10 so as to be embedded in the packets by the appropriate edge node.

Figure 2:
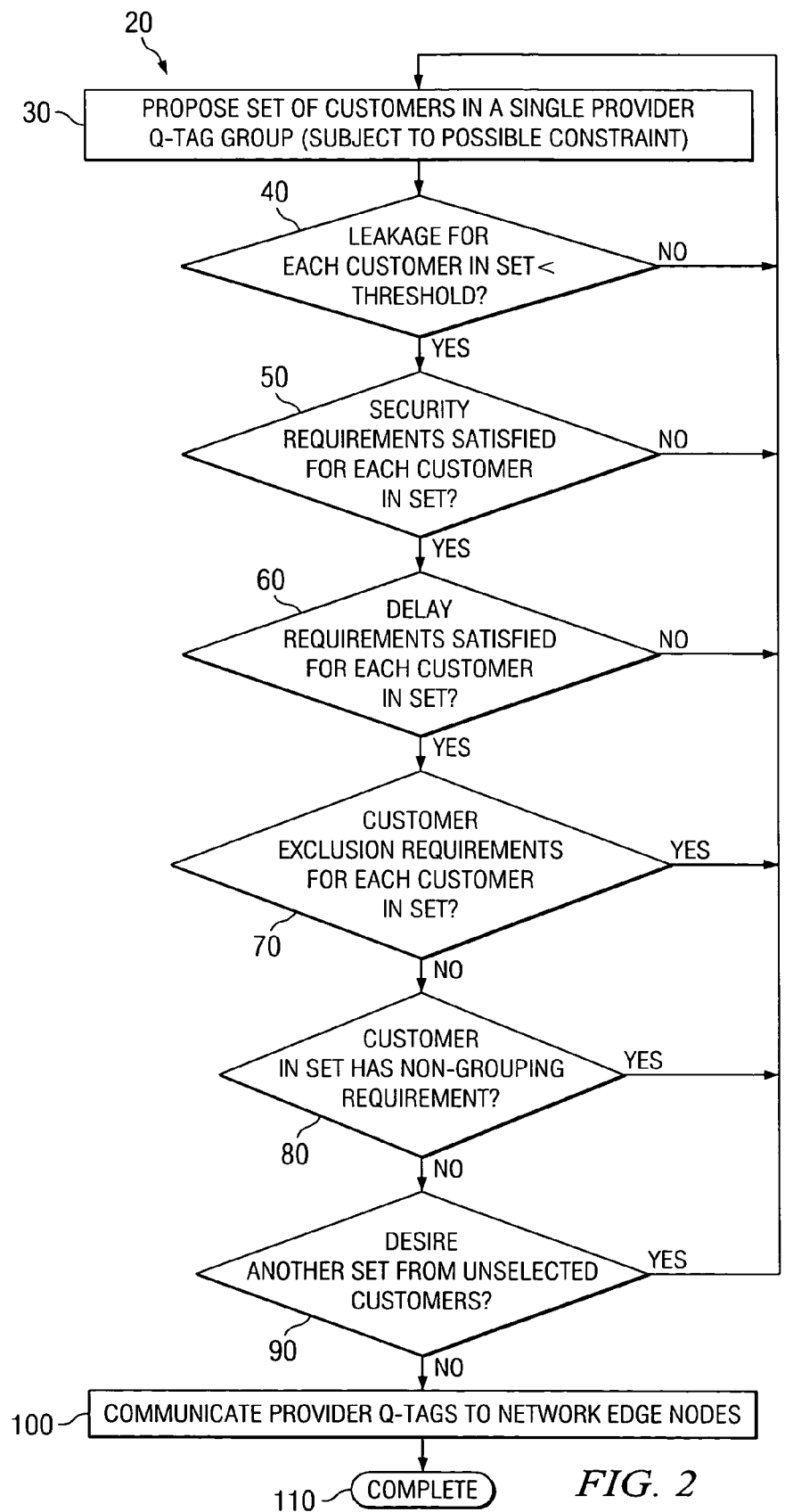
FIG. 2 illustrates a flow chart of a method of operation for determining provider Q-tags and using them in connection with the nodes of the system of FIG. 1.

FIG. 2 illustrates a flowchart of a preferred embodiment method designated generally at 20. As will be appreciated from the following discussion, method 20 provides steps per the introduction above with respect to reducing, as compared to the prior art, a number of provider Q-tags. To facilitate an understanding of method 20, it is discussed in connection with system 10 of FIG. 1, but one skilled in the art should appreciate that these steps also may apply to other networks. Further, method 20 may be implemented, by way of example, as a computer program in a system that includes sufficient hardware, software, and data information so as to analyze the steps detailed below, and that system may be part of or independent of system 10 during a portion of its analysis. Either within system 10 or independent from it, the provider Q-tags determined as part of method 20 are also communicated in that method in some manner to the edge nodes so as to be implemented within system 10. Alternatively, but perhaps less efficiently, portions of method 20 may be implemented with manual operations provided sufficient time and data is available so as to process the various considerations given below, where again however the ultimate determined provider Q-tags are communicated to and implemented in system 10. In any event, the overall procession of method 20 will be appreciated from the remaining discussion. Before reaching that discussion, note also that method 20 is shown as a sequence of steps for sake of one example and to facilitate an understanding of various considerations. In implementation, certain of those steps may be re-arranged, eliminated, or additional steps may be added to supplement method 20. Moreover, while the flowchart suggests a sequential flow, certain steps may be analyzed concurrently, as a state machine, or in still other manners as will be ascertainable by one skilled in the art.

Turning now to method 20 in detail, it commences with a step 30. Step 30 proposes a set of customers from all the customers that will use system 10, to share a single provider Q-tag and where the proposed set includes more than one customer. In step 30, an additional constraint(s) may be used so as to limit the possible selection of those customers that are proposed to share the same provider Q-tag. For example, recall that earlier the IEEE 802.1ad proposal was mentioned wherein a set of customers that have nodes connected to the exact same group of edge nodes may share a same provider Q-tag. In contrast, step 30 may be guided in that it proposes a set of customers that share (i.e., are respectively or mutually connected to) a number of edge nodes in the considered network, where the shared number is less than the total number of all edge nodes to which each customer in the set is connected. Also, the shared number may be stated as a percentage of the total connections between a customer and its respective edge nodes. For example as applied to system 10, step 30 may make a proposal wherein each of the proposed customers is connected to at least three of the same five edge nodes or at least 60% of the same edge nodes (i.e., $3/5=60\%$) of system 10. Thus, a first such set could include customers $CST_1$ and $CST_2$ because they share (are both connected to the same group of three edge nodes $EN_1$, $EN_2$ and $EN_3$. Alternatively, a second such set could include customers $CST_1$ and $CST_3$ because they share three edge nodes $EN_1$, $EN_2$ and $EN_5$, or a third such set could include customers $CST_3$ and $CST_4$ because they share three edge nodes $EN_1$, $EN_4$ and $EN_5$. Note also that following step 30 the proposed customer set will be evaluated in terms of various conditions and, thus, a failure to meet one of those conditions will cause flow to return to step 30 wherein a different set of customers may be proposed. In other words, method 20 preferably operates so as to repeat various of its steps to ultimately converge on one or more sets of customers, where each such set of customers shares a same provider Q-tag for that set. Thus, optionally step 30 also may store a record of each proposed set so that it is not re-proposed in a later instance of step 30, should such an instance occur. Following step 30, method 20 continues to step 40.

Figure 3:
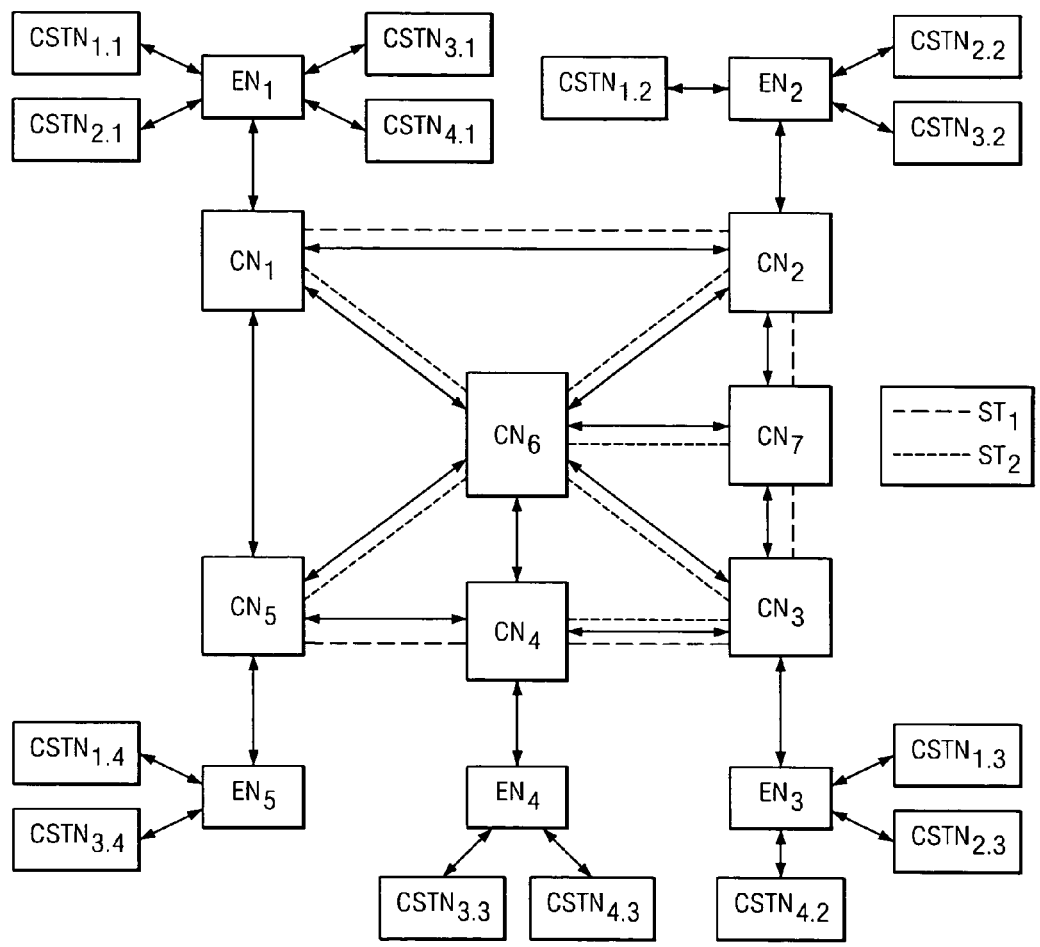
FIG. 3 illustrates the network system of FIG. 1 along with two examples of spanning trees.

Step 40 determines whether the leakage, for each customer in the set of customers determined by step 30, is below a threshold. In this context, note that the term leakage is a measure of extra use of bandwidth to the extent of broadcast packets reaching edge nodes that did not otherwise need to receive such packets. Moreover, leakage also may be influenced by an additional layer of topology if it exists, such as a spanning tree. To further illustrate these principles, attention is directed to FIG. 3. Specifically, FIG. 3 again illustrates system 10 of FIG. 1, but as an addition spanning trees $ST_1$ and $ST_2$ are shown. As known in the art, each such spanning tree imposes an additional level of routing restraint for a packet communicated along that tree. Looking then to the concept of leakage, a few examples below further demonstrate this concept, from which additional observations may be made with respect to step 40.

As a first example of leakage consideration, suppose that customer node $CSTN_{3,4}$ desires to issue a broadcast packet to all customer nodes for customer $CST_3$, and that the packet is to travel along spanning tree $ST_1$. In this case, the broadcast packet is first received by edge node $EN_5$ and then communicated to core node $CN_5$. From core node $CN_5$, the broadcast packet travels to core node $CN_4$ and, thus, is available via edge node $EN_4$ to the customer $CST_3$ customer node $CSTN_{3.3}$. Continuing along spanning tree $ST_1$, the broadcast packet continues from core node $CN_4$ to core node $CN_3$. Note, with respect to core node $CN_3$ and the edge node $EN_3$ to which it is connected, there is no connection to a customer $CST_3$ customer node. Thus, at first glance, it might appear that arrival of this customer $CST_3$ broadcast packet to edge node $EN_3$ constitutes leakage because it is not connected to a customer $CST_3$ edge node. However, note further that spanning tree $ST_1$ is linear in the sense of passing from core node $CN_4$, through core node $CN_3$, on to other core nodes that indeed require the customer $CST_3$ broadcast packet; thus, core node $CN_3$ is necessarily required to receive this broadcast packet so as to forward it onward in the linear path of spanning tree $ST_1$, in the present case through core node $CN_7$ to core node $CN_2$. Once at core node $CN_2$, the broadcast packet may be communicated through edge node $EN_2$ to customer $CST_3$ customer node $CN_{3.2}$. Lastly, the broadcast packet also is communicated to core node $CN_1$, from where it may be communicated through edge node $EN_1$ to customer $CST_3$ customer node $CN_{3.1}$. Thus, in this example, for a broadcast packet along spanning tree $ST_1$ with respect to customer $CST_3$, there is no leakage.

As a second example of leakage consideration, suppose that customer node $CSTN_{3.4}$ desires to issue a broadcast packet to all customer nodes for customer $CST_3$, but in this example assume that the packet is to travel along spanning tree $ST_2$. Once again, the packet is first received by edge node $EN_5$ and then communicated to core node $CN_5$, but it next is communicated to core node $CN_6$. Core node $CN_6$ communicates the broadcast packet via spanning tree $ST_2$ to core nodes $CN_1$ and $CN_2$, each of which is connected through a respective edge node $EN_1$ and $EN_2$ to a customer $CST_3$ customer node $CN_{3.1}$ and $CN_{3.2}$, respectively. Additionally, core node $CN_6$ also communicates the broadcast packet to core node $CN_3$, which is not directly connected to an edge node that is connected to a customer $CST_3$ customer node. Once again, however, this path is also required to connect from core node $CN_6$, via core node $CN_3$, to core node $CN_4$, and that latter core node $CN_4$ is directly connected to an edge node that is connected to a customer $CST_3$ customer node, namely, core node $CN_4$ is connected to an edge node $EN_4$ which is connected to customer $CST_3$ customer node $CSTN_{3.3}$. Thus, there is also no leakage in this example.

As a third example of leakage consideration, suppose that customer $CST_2$ customer node $CSTN_{2.2}$ desires to issue a broadcast packet to all customer nodes for customer $CST_2$, and that the packet is to travel along spanning tree $ST_1$. In this case, note that leakage does indeed occur. Looking first where there is no leakage, edge node $EN_2$ communicates the broadcast packet to core node $CN_2$, which communicates it to core nodes $CN_1$ and $CN_3$ (through core node $CN_7$), which communicate the packet to respective edge nodes $EN_1$ and $EN_3$ to respective customer $CST_2$ customer nodes $CSTN_{2.1}$ and $CSTN_{2.3}$. However, in illustrating actual leakage, the broadcast packet also continues to core nodes $CN_4$ and $CN_5$. Each of these core nodes is connected to a respective edge node $EN_4$ and $EN_5$ that is not connected to a customer $CST_2$ customer node. Accordingly, for this example, there is leakage of a total of two edge nodes.

Given the preceding examples and returning to step 40, one skilled in the art should appreciate that all possible leakage instances may be evaluated given all customer nodes for all customers in the set proposed by step 30. These instances may be quantified in some manner, such as the number of all edge nodes for the customer set that could receive packets for which leakage occurs. This number, or some other quantification, is then compared in step 40 to a threshold, where the threshold may be established by one skilled in the art. The result of the comparison then directs the flow from step 40. For example, in the case of using a less than criterion in step 40, then if the quantification (e.g., number of leakage edge nodes) is less than the threshold, then method 20 continues from step 40 to step 50; in that case, and as further appreciated below, then step 30 has effectively provided a leakage-acceptable set of customers for which it is proposed that those customers will share a single provider Q-tag. Thus, for later communications in the network, such as in system 10, a broadcast to any one of those customers will be routed by that single provider Q-tag and, thus, will reach any edge node mapped to that single provider Q-tag. In contrast, if the leakage quantification is equal to or greater than the step 40 threshold, then method 20 returns from step 40 to step 30 so that a different set of customers may be proposed and for which a single provider Q-tag might be shared. Lastly, note of course that the less than condition of step 40 may be changed to less than or equal to, or the threshold may be adjusted, but in either case the method flow is directed generally in comparison of leakage quantification to some threshold.

Following step 40 is a group of four conditional steps 50, 60, 70, and 80. As appreciated from the following, each such step represents the evaluation of whether the set of customers, proposed as possibly sharing a same provider Q-tag, satisfies some type of respective condition. Each of these conditions may exist in various contexts and, indeed, they may all be incorporated into a service level agreement ("SLA") that the customer has with its SP (or other network provider or manager); the conditions also may be imposed as restrictions for other reasons as well, such as policies implemented by the SP for various reasons. In any case, assuming that the proposed customer set has satisfied the threshold condition of step 40, each of these SLA (or other) conditions is tested. If all conditions are met, then method 20 continues to step 90 discussed later. However, in a preferred embodiment, if any one of the conditions is not met, then method 20 returns the flow to method 30, to again propose a different set of customers for possibly sharing a same provider Q-tag. Additionally, while the example of FIG. 2 illustrates that non-satisfaction of any one condition in the four conditions of steps 50 through 80 causes the proposed set not to be furthered and a return to step 30, in an alternative embodiment these conditions may be modified or combined so that in some instances the flow is permitted to go forward to step 90, thereby permitting the set to share a single Q-tag, even if non-satisfaction of a particular condition occurs, for example if in that case a percentage or majority of the other conditions are all met or if in a given case the non-satisfied condition is deemed less restraining because, for example, the other three conditions are all satisfied. In any event, the conditions of each of steps 50 through 80 are further discussed below.

Step 50 determines whether permitting each customer in the proposed set to share a same provider Q-tag would violate a security concern or agreement of the customer. For example, some customer networks may have a need, as may arise from their data types, to have strong security of their communications. Such security may be in the nature of limiting the chance of such data being received by a customer node not belonging to the given customer, that is, a customer node of a different C-VLAN that also operates using the resources of system 10. By way of example, suppose that step 30 proposes a set of customers $CST_1$, $CST_2$, and $CST_3$ all share a single provider Q-tag. However, assume further that customer $CST_1$ is a financial institution with highly proprietary data, and it has an agreement, and possibly even pays an additional fee, with its network SP to guarantee a certain level of network security. In this case, when this proposed set reaches step 50, the set fails the condition of that step due to the security requirements with respect to customer $CST_1$. Accordingly, method 20 returns from step 50 to step 30 to propose a different set of customers. Conversely, if the security requirements, if any, of each customer in the set are satisfied while still being combined with the other customers in the set to use a single Q-tag, then method 20 continues from step 50 to step 60.

Step 60 determines whether permitting each customer in the proposed set to share a same provider Q-tag would violate a delay requirement of any customer in the set, such as in terms of a minimum delay guarantee for one or more customers in that set. For example, some customers may have continuous high speed data needs, such as through video data or the like. As a result, the customer may have a guarantee in its SLA that its data will not have a delay greater than some threshold. Further, there is a chance therefore, that by grouping such a customer with others to share a same provider Q-tag, this guarantee may be less likely to be satisfied. Accordingly, step 60 determines whether at least one customer has a delay requirement that is beyond a threshold, and that threshold may be established by one skilled in the art. If so, when this proposed set reaches step 60, the set fails the condition of that step due to the delay requirements with respect to the given customer(s). Accordingly, method 20 returns from step 60 to step 30 to propose a different set of customers. Conversely, if each customer in the set has no delay requirements or delay requirements that presumably can still be satisfied while still combining those customers in a set to use a single Q-tag, then method 20 continues from step 60 to step 70.

Step 70 determines whether permitting each customer in the proposed set to share a same provider Q-tag would violate a customer exclusion requirement of any customer in the set. More specifically, since the preferred embodiments contemplate grouping different customers with a single Q-tag, then also contemplated would be permitting a customer to request that a certain other customer not be grouped with the requesting customer in the same set. For example, one customer might request that business competitors not be grouped in the same set with the requesting customer. Other bases for making such a request will depend on the customers' interests as well as other considerations. Again, such a request may be incorporated into the requesting customer's SLA. In any event, step 70 determines whether at least one customer has a customer exclusion requirement that would be violated by permitting the proposed customer set to share a provider Q-tag. If such a violation would occur, then method 20 returns from step 70 to step 30 to propose a different set of customers. Conversely, if each customer in the set has no such requirement or if no violation of such a requirement would occur while still combining those customers in a set to use a single Q-tag, then method 20 continues from step 70 to step 80.

Step 80 determines whether permitting each customer in the proposed set to share a same provider Q-tag would violate a customer requirement that it not be included in such a set. Specifically, and as similar to the consideration of step 70, also contemplated in the preferred embodiments would be permitting a customer to request that it never be grouped with one or more other customers for purposes of sharing a provider Q-tag, again where the customer reasons for such a request may vary. Indeed, if multiple-customer sets for provider Q-tags is to be the default mechanism for the network, then such a requesting customer also may be requested to pay a fee or provide other consideration for such a request, where this request also may be incorporated into the requesting customer's SLA. In any event, step 80 determines whether at least one customer has such a grouping prohibition that would be violated by the present proposed set. If such a violation would occur, then method 20 returns from step 80 to step 30 to propose a different set of customers. Conversely, if each customer in the set has no such requirement, then method 20 continues from step 80 to step 90.

Step 90 determines whether another set should be proposed from those customers that have not yet been placed into an acceptable set of more than one customers. For example with respect to system 10, if step 30 first proposed customers CST1 and CST2 in a first set to share a provider Q-tag and that proposed set satisfied the conditions of all of steps 40 through 80, then step 90 might return the flow to step 30 to consider as a second set the group of customer CST3 and CST4 to share a different provider Q-tag. Of course, in systems with a larger number of customers (as is common and indeed benefited by the preferred embodiments), the considerations of step 90 may be adjusted so that method 20 will properly converge on a desirable number of customer sets while not re-considering variations of sets that have already been proposed but have failed one or more of the conditions of steps 40 through 80. In any event, if another proposed set is desired, then method 20 returns from step 90 to step 30, whereas if sufficient sets have been proposed, then method 20 continues from step 90 to step 100.

Step 100 represents the communication of the newly-determined Q-tags to the network (e.g., system 10) and the use thereafter of those tags. For example, those Q-tags may be written to code, storage, or memory within the edge nodes, or otherwise provided by a protocol or the like to the edge nodes so that the provider Q-tags thereafter govern the appropriate routing of packets within system 10. Thus, during learning or the like each edge node is informed of the sets of customers corresponding to each provider Q-tag and thereafter during operations the appropriate ingress edge node inserts the appropriate provider Q-tag into the packet and the packet is routed by the core network, where still thereafter the appropriate egress edge node removes the corresponding provider Q-tag and routes the packet to the proper customer node(s).

Following step 100 is shown a complete step 110 merely to illustrate the close of the preceding discussion with the understanding that method 20 may, in part or whole, be repeated when desired or necessary such as with a reset or change of topology.

From the above illustrations and description, one skilled in the art should appreciate that the preferred embodiments provide a network with customer sets such that provider Q-tags may be flexibly shared by more than one customer on a VLAN. Thus, there is a reduction of the label space required in a bridged MEN. As a result, the approach is highly scalable for VLAN grouping in a MEN as the number of customers may be increased even beyond the bit-limits of the provider Q-tag. Additionally, there is a reduction in the look-up table required at the edge nodes so as to insert the provider Q-tags. Still further, there is a reduction of MAC address learning as compared to the prior art. As yet another advantage, the preferred embodiments may apply to other encapsulated schemes and other network systems.

As still another benefit, while the present embodiments have been described in detail, various substitutions, modifications or alterations could be made to the descriptions set forth above without departing from the inventive scope. For example, while certain criteria have been discussed for purposes of developing and selecting the proposed customer sets, still other criteria may be added or substituted. As another example, various types of techniques for converging on the best-selection of customer sets from perhaps differing sets that all meet the stated criteria may be implemented. For example, a scoring system could be developed to apply scores to sets that meet the stated criteria, with a step of thereafter selecting those proposed sets with the highest scores. Still other alternatives will be ascertainable by one skilled in the art. Thus, these advantages as well as the preceding descriptions further serve to exemplify the inventive scope, as is defined by the following claims.

The invention claimed is:

1. A method of routing packets in a network system, the network system comprising a plurality of edge nodes, a plurality of core nodes wherein selected core nodes in the plurality of core nodes are coupled to communicate with selected edge nodes in the plurality of edge nodes, and a plurality of external nodes external from the edge nodes with selected external nodes coupled to communicate with selected edge nodes in the plurality of edge nodes wherein different external nodes in the plurality of external nodes are associated with a plurality of different entities sharing resources on the network system, the method comprising:

proposing a set of entities from the plurality of different entities, wherein the proposed set comprises entities associated with external nodes that share respective connections to a number of edge nodes in the plurality of edge nodes such that the shared number is less than a total number of all edge nodes to which each different entity in the set is connected;

assigning a single edge node tag to the proposed set of entities; and communicating the single edge node tag to the plurality of edge nodes such that the single edge node tag may be inserted into packets by edge nodes for purposes of routing those packets through certain core nodes in the plurality of core nodes and to external nodes corresponding to the single edge node tag, conditioned on determining that the proposed set of entities, by sharing the single edge node tag, will provide for a leakage among the edge nodes below a threshold and further conditioned on determining that the proposed set of entities, by sharing the single edge node tag, will not violate an imposed restriction, wherein the imposed restriction is selected from a set consisting of:

data security requirements of any entity in the proposed set of entities;

data delay requirements of any entity in the proposed set of entities;

a prohibition that excludes one or more entities in the plurality of entities from sharing the single edge node tag; and a prohibition against grouping of a particular entity with other entities for purposes of sharing a single edge node tag.

2. The method of claim 1 wherein the communicating step is conditioned on determining that the proposed set of entities, by sharing the single edge node tag, will not violate a respective agreement between any entity in the proposed set of entities with a manager of the network system.

3. The method of claim 2 wherein each respective agreement comprises a service level agreement.

4. The method of claim 1 wherein the communicating step is conditioned on determining that the proposed set of entities, by sharing the single edge node tag, will not violate a respective agreement pertaining to data security between any entity in the proposed set of entities and a manager of the network system.

5. The method of claim 1 wherein the communicating step is conditioned on determining that the proposed set of entities, by sharing the single edge node tag, will not violate a respective agreement pertaining to data delay between any entity in the proposed set of entities and a manager of the network system.

6. The method of claim 1 wherein the communicating step is conditioned on determining that the proposed set of entities, by sharing the single edge node tag, will not violate a respective agreement between any entity in the proposed set of entities and a manager of the network system, wherein the respective agreement pertains to excluding one or more entities in the plurality of entities from sharing the single edge node tag.

7. The method of claim 1 wherein the communicating step is conditioned on determining that the proposed set of entities, by sharing the single edge node tag, will not violate a respective agreement between any entity in the proposed set of entities and a manager of the network system, wherein the respective agreement prohibits grouping a particular entity with other entities for purposes of sharing a single edge node tag.

8. The method of claim 1:

wherein the communicating step is conditioned on determining that the proposed set of entities, by sharing the single edge node tag, will not violate a respective agreement between any entity in the proposed set of entities and a manager of the network system; and wherein the respective agreement comprises an agreement selected from a set consisting of:

an agreement with data security requirements between any entity in the proposed set of entities and the manager of the network system;

an agreement with data delay requirements between any entity in the proposed set of entities and the manager of the network system;

an agreement that prohibits excludes one or more entities in the plurality of entities from sharing the single edge node tag; and an agreement that prohibits grouping a particular entity with other entities for purposes of sharing a single edge node tag.

9. The method of claim 8 wherein selected edge nodes, selected core nodes, and selected external nodes form a virtual private local area network for a corresponding one of the different entities.

10. The method of claim 9 wherein the selected external nodes comprise customer nodes.

11. The method of claim 9:

wherein the edge tag is identified in each packet by a binary field having an integer number N of bits; and wherein the plurality of different entities consists of a number greater than $2^N$ of different entities.

12. The method of claim 1 wherein the communicating step is conditioned on determining that the proposed set of entities, by sharing the single edge node tag, will not violate a respective agreement between any entity in the proposed set of entities with a manager of the network system.

13. The method of claim 1 wherein the communicating step is conditioned on determining that the proposed set of entities, by sharing the single edge node tag, will not violate a respective agreement pertaining to data security between any entity in the proposed set of entities and a manager of the network system.

14. The method of claim 1 wherein the communicating step is conditioned on determining that the proposed set of entities, by sharing the single edge node tag, will not violate a respective agreement pertaining to data delay between any entity in the proposed set of entities and a manager of the network system.

15. The method of claim 1 wherein the communicating step is conditioned on determining that the proposed set of entities, by sharing the single edge node tag, will not violate a respective agreement between any entity in the proposed set of entities and a manager of the network system, wherein the respective agreement pertains to excluding one or more entities in the plurality of entities from sharing the single edge node tag.

16. The method of claim 1 wherein the communicating step is conditioned on determining that the proposed set of entities, by sharing the single edge node tag, will not violate a respective agreement between any entity in the proposed set of entities and a manager of the network system, wherein the respective agreement prohibits grouping a particular entity with other entities for purposes of sharing a single edge node tag.

17. The method of claim 1:
wherein the communicating step is conditioned on determining that the proposed set of entities, by sharing the single edge node tag, will not violate a respective agreement between any entity in the proposed set of entities and a manager of the network system; and
wherein the respective agreement comprises an agreement selected from a set consisting of:
an agreement with data security requirements between any entity in the proposed set of entities and the manager of the network system;
an agreement with data delay requirements between any entity in the proposed set of entities and the manager of the network system;
an agreement that prohibits excludes one or more entities in the plurality of entities from sharing the single edge node tag; and
an agreement that prohibits grouping a particular entity with other entities for purposes of sharing a single edge node tag.

18. The method of claim 1: wherein the communicating step is conditioned on determining that the proposed set of entities, by sharing the single edge node tag, will not violate an imposed restriction, wherein the imposed restriction is selected from a set consisting of:
data security requirements of any entity in the proposed set of entities;
data delay requirements of any entity in the proposed set of entities;
a prohibition that excludes one or more entities in the plurality of entities from sharing the single edge node tag; and
a prohibition against grouping of a particular entity with other entities for purposes of sharing a single edge node tag.

19. The method of claim 1 wherein the network system comprises a Metro Ethernet Network system.

20. A network system, comprising:
a plurality of edge nodes;
a plurality of core nodes, wherein selected core nodes in the plurality of core nodes are coupled to communicate with selected edge nodes in the plurality of edge nodes; and
a plurality of external nodes external from the edge nodes with selected external nodes coupled to communicate with selected edge nodes in the plurality of edge nodes wherein different external nodes in the plurality of external nodes are associated with a plurality of different entities sharing resources on the network system;
wherein the network system is operable according to a method, the method comprising:
proposing a set of entities from the plurality of different entities, wherein the proposed set comprises entities associated with external nodes that share respective connections to a number of edge nodes in the plurality of edge nodes such that the shared number is less than a total number of all edge nodes to which each different entity in the set is connected;
assigning a single edge node tag to the proposed set of entities; and
communicating the single edge node tag to the plurality of edge nodes such that the single edge node tag may be inserted into packets by edge nodes for purposes of routing those packets through certain core nodes in the plurality of core nodes and to external nodes corresponding to the single edge node tag, conditioned on determining that the proposed set of entities, by sharing the single edge node tag, will not violate an imposed restriction, wherein the imposed restriction is selected from a set consisting of:
data security requirements of any entity in the proposed set of entities;
data delay requirements of any entity in the proposed set of entities;
a prohibition that excludes one or more entities in the plurality of entities from sharing the single edge node tag; and
a prohibition against grouping of a particular entity with other entities for purposes of sharing a single edge node tag.

21. The system of claim 20 wherein the communicating step is conditioned on determining that the proposed set of entities, by sharing the single edge node tag, will provide for a leakage among the edge nodes below a threshold.

* * * * *